UTLEY, KIMBALL & REYNOLDS.
Cheese Bandage.

No. 82,895.

Patented Oct. 6, 1868.

United States Patent Office.

ALBERT M. UTLEY, H. N. KIMBALL, AND WILLIAM REYNOLDS, OF WATERTOWN, NEW YORK.

Letters Patent No. 82,895, dated October 6, 1868.

IMPROVEMENT IN BOXING, BANDAGING, AND PREPARING CHEESE.

The Schedule referred to in these Letters Patent and making part of the same.

TO WHOM IT MAY CONCERN:

Be it known that we, ALBERT M. UTLEY, H. N. KIMBALL, and WILLIAM REYNOLDS, of Watertown, in the county of Jefferson, and State of New York, have invented certain new and useful Improvements in the Method of and Means for Bandaging, Boxing, and Preparing Cheese for the Market; and we hereby declare the following to be a full, clear, and exact description of the same, reference being had to the accompanying drawings, in which—

The principal object of this invention is to combine, in one device, a bandage for the sides of the cheese, in which the same may be held and cured with great advantage, and a box, in which the said cheese may be securely packed and transported.

The ordinary method of bandaging and boxing cheese is well known, and therefore does not require elaborate description. It is sufficient to say that the cheese, when taken out of the press, is bandaged with cotton cloth, which is drawn tightly around its sides, and then fastened or pasted together. The disadvantages attending the use of textile fabric for this purpose are so many and great, that paper has been substituted in lieu of the same, for which improvement Letters Patent have been issued to one of the present applicants.

In transporting cheese, whether bandaged with paper or cloth, but one method has been heretofore pursued. The cheese is placed within a box, and in this condition is shipped and transported from place to place.

This method is open to many and great objections. The cost of the box itself is no trifling item of expense, and then, as the box must be larger than the cheese, the latter, when being handled or transported, will inevitably be much shaken and jolted from side to side. The box also necessarily takes up much room which would not be occupied by the cheese itself, and it is, moreover, liable in many instances to become broken and injured, thus leaving the cheese in an exposed and unprotected condition.

By our invention, we dispense entirely with the necessity of packing the cheese in a separate box, and we employ the bandage in such manner that it will in itself constitute the sides of the cheese-box. The manner in which we proceed to effect this result can, however, best be explained by reference to the drawings.

Before the cheese is taken from the press, we provide strips of paper, preferably made of manilla or other stock of long fibre, which are intended to form at once the bandage and the sides of the box. These strips, which are of a width equal to the thickness of the cheese, are formed into a hoop-shape around a former, so as to be as nearly as possible of the exact size of the cheese, and the ends of each bandage are secured together by suitable means. We much prefer to employ for this purpose diamond-shaped metal-fasteners, $a$, the pointed ends of which are inserted through the lapping-ends, and then bent over so as to clasp and hold the parts securely together. As each cheese is taken from the press, one of the hoop-bandages, A, of corresponding size, is forced down over the cheese, so as to encircle and support its sides, and, by this means, that is, an already formed and perfected bandage, we avoid the necessity of wrapping and stretching the paper around the cheese, and then securing its ends, which operation is oftentimes difficult to accomplish properly.

Figure 1:
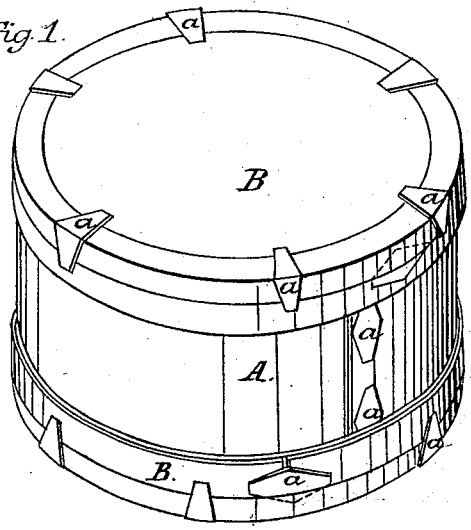
Figure 1 is a perspective view of a cheese bandaged, boxed, and prepared for the market.
Figure 2:
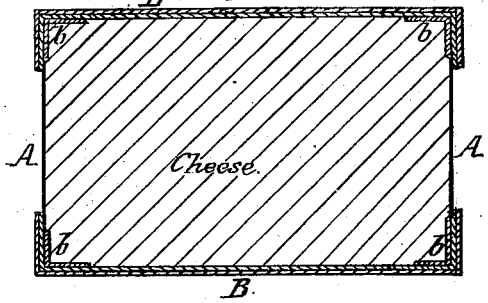
Figure 2 is a vertical central section of the same.
Figure 3:
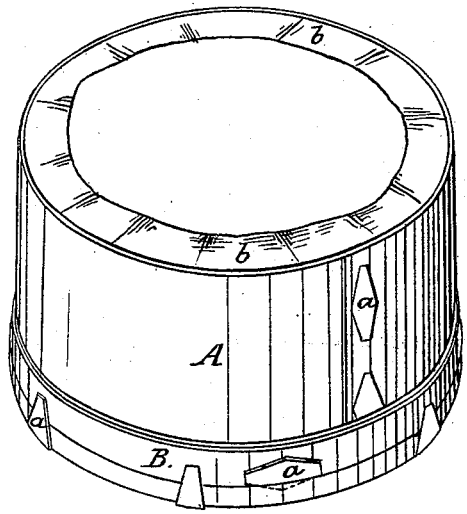
Figure 3 is a perspective view of the same, with the top cover removed.
Figure 4:
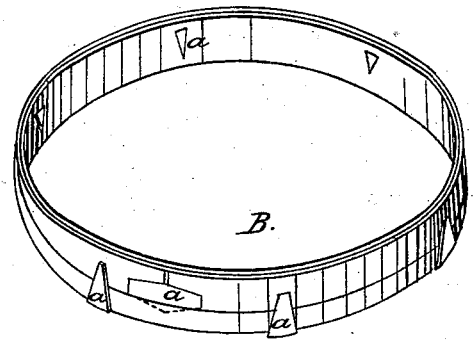
Figure 4 is a representation of one of the covers.

The supporting-piece A binds and holds up the cheese, and in order to prevent the entrance of flies or dirt between the cheese and bandage, we attach to the top and bottom of the latter, flaps, $b$, of cotton cloth or other suitable fabric, which, when the piece A is in place, are pasted over on the cheese, as represented in fig. 3, thus effectually excluding all foreign substances.

In curing the cheese, it is, as is well known, turned frequently. When cured, the outer part of the cheese will be united with the paper A, so that the latter, in effect, becomes the rind, the cheese-rind itself being much thinner with a bandage of this description than is ordinarily the case. The cheese also requires less scalding and salting, and retains its moisture to a greater extent, thus resembling English cheese.

In order to box and prepare the cheese for market, we proceed as follows:

We make two covers, B, of suitable material, preferably of paper, and we fit one of these covers over the top and one over the bottom of the cheese. The top and sides of the covers are held together mainly by diamond-clasped metal fasteners, $a$, similar to those already named. In this instance, the fasteners are bent over the edge of the cover, at their widest part—that is, on a line extending between their obtuse angles—and are stuck up by formers or dies, so that their bend shall conform to the curve of the circular edge of the cover.

It will be seen that the covers are applied as shown in the drawings, and, as just described, the cheese is completely boxed and prepared for transportation, the paper bandage A forming the sides of the box, and the covers B not only protecting the ends of the cheese, but also the top and bottom edges of the bandage. In this state the cheese can be shipped and sent off to any distance with perfect safety. The cost of the pieces A and B is but comparatively trifling, and by simply removing one of the covers access to the cheese can be had at all times and for any purpose. Either or both of the covers B may be made movable, as desired.

A great advantage resulting from our invention is this, that we are enabled to make and put up cheeses of small size—say from six to ten pounds, or even smaller—for, as above stated, the cost of the covers and bandage is but little, and when thus prepared, there is no occasion for the use of a packing box, so that the retail dealer, instead of cutting up large cheeses to satisfy the wants of customers, can have a number of these small cheeses for sale, each perfect in itself, and better packed and prepared for use than is possible in the other case. And it is thus practicable to produce for small consumers what may be considered as a new article of merchandise. The cheese is of a size suited to the wants of the purchaser, it is already wrapped, and the bandage forms in some sort a permanent box, from which at any time the cover can readily be removed, while the flap $b$ serves to protect and shield from injury or exposure all the uncut cheese.

It will, of course, be understood that while we prefer to employ the diamond-shaped fasteners herein described, rivets, paste, or other fastening devices may be employed for the purpose.

We are aware that the patent of W. B. Nickelson, November 13, 1866, describes a method of boxing cheese by the employment, in connection with a wooden hoop, which supports the sides of the cheese during the process of curing, of top and bottom covers. But it is well known to those interested in the manufacture of cheese that the wooden hoop is in no sense the equivalent of the means employed by us, and that the same results cannot be obtained by its use. The hoop at all times, both during the process of curing and afterwards, is removable and entirely separate from the cheese. Its sole use is to support the sides of the cheese during curing. After being cured, the cheese is boxed by applying top and bottom covers to the wooden hoop, which, however, can, without difficulty, and with equally good results, be removed and replaced by another. It, moreover, does not prevent shrinkage, and the cheese is apt to become loose and to be shaken from one side to the other of the hoop.

Under our invention the paper bandage is, on the contrary, united solidly with the cheese, forming, in effect, the rind, and while, as above explained, we are enabled by its use to save at least five per cent. in shrinkage, nevertheless, whether the cheese shrink more or less, the bandage will conform to the change, and will at all times remain united with the cheese.

The hoop of Nickelson, in fact, amounts to little more, during the process of curing, than an ordinary cheese-hoop or turner, while by our method we attain the advantages above stated, which, as is well known to cheese manufacturers and dairymen, are of the greatest value and practical importance.

What we claim, therefore, and desire to secure by Letters Patent, is—

1. The use, in connection with covers for the top and bottom of the cheese, of a paper bandage, encircling and permanently united, during the process of curing, with the sides of the cheese, substantially in the manner and for the purposes set forth.

2. The combination with the paper bandage, for encircling and holding the sides of the cheese, of top and bottom flaps of cotton or other suitable fabric, applied and used in the manner specified.

In testimony whereof, we have signed our names to this specification before two subscribing witnesses.

ALBERT M. UTLEY.
H. N. KIMBALL.
WILLIAM REYNOLDS.

Witnesses:
JNO. C. McCARTIN,
JNO. M. SIGOURNEY.